United States Patent [19]

Guarino et al.

[11] Patent Number: 4,863,180
[45] Date of Patent: Sep. 5, 1989

[54] SULKY WITH MOVABLY COUPLED AND STABILIZED RAIL

[76] Inventors: Mark A. Guarino, 502 Maddison Dr., East Windsor, N.J. 08520; Michael J. Acerno, 262 Highway 33, Freehold, N.J. 07728

[21] Appl. No.: 132,466

[22] Filed: Dec. 14, 1987

[51] Int. Cl.⁴ ............................................... B62C 1/08
[52] U.S. Cl. .................................................... 280/63
[58] Field of Search ................. 280/63, 64, 65, 446.1, 280/460.1, 488, 489

[56] References Cited

U.S. PATENT DOCUMENTS

| | | | |
|---|---|---|---|
| 571,003 | 11/1896 | Keeler | 280/64 |
| 3,388,921 | 6/1968 | Pickard | 280/63 |
| 3,482,851 | 12/1969 | Pickard | 280/63 |
| 3,628,806 | 10/1969 | Weber | 280/63 |
| 3,944,243 | 3/1976 | Yates | 280/63 |
| 4,071,257 | 1/1978 | Discount | 280/63 |
| 4,078,829 | 3/1978 | Davis | 280/657 |
| 4,095,815 | 6/1978 | Mitchell | 280/63 |
| 4,326,367 | 4/1982 | Cashman | 54/2 |
| 4,679,807 | 7/1987 | Raybon | 280/47.25 X |

FOREIGN PATENT DOCUMENTS 3413289 10/1984 Fed. Rep. of Germany ........ 280/63

*Primary Examiner*—Charles A. Marmor
*Assistant Examiner*—Michael Mar
*Attorney, Agent, or Firm*—Harvey L. Cohen

[57] ABSTRACT

A sulky for carrying a rider behind a horse, comprising an arch, a pair of wheels and a pair of substantially horizontal rails flexibly or movably coupled to the arch, the rails adapted to embrace the flanks of the horse and further comprising stabilization. In a particularly preferred embodiment, a pivot joint between the rail and the arch permits lateral motion of the rail, a shock absorber provides stabilization, and a fork assembly for each side of the sulky is incorporated which fork assembly is capable of telescoping axial motion. The sulky results in improved performance including tracking, efficiency and safety.

20 Claims, 3 Drawing Sheets

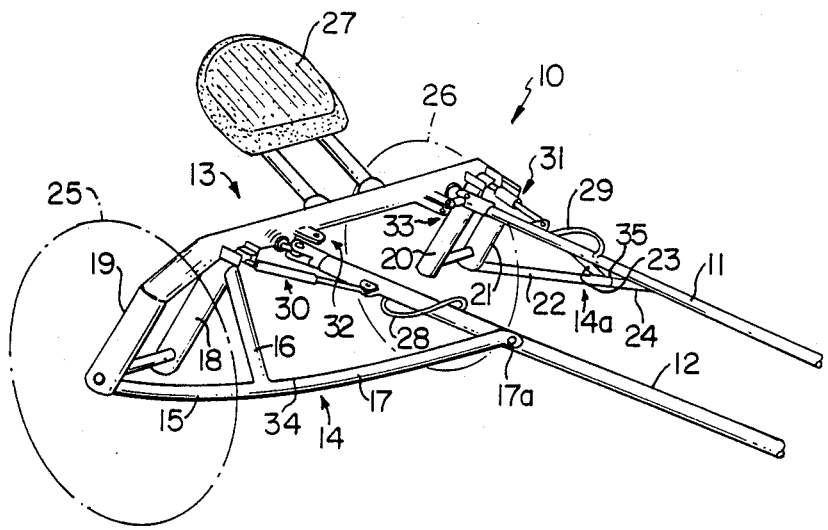
FIG. 1
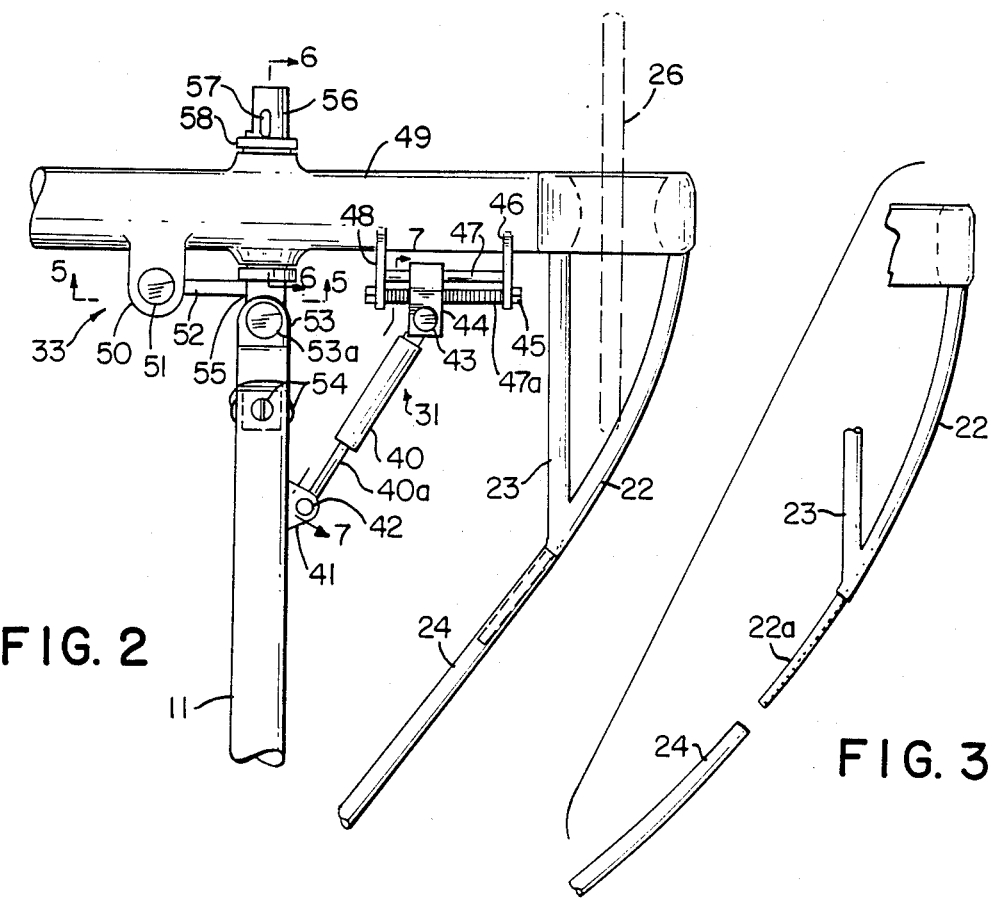
FIG. 2
FIG. 3

SULKY WITH MOVABLY COUPLED AND STABILIZED RAIL

BACKGROUND OF THE INVENTION

This invention relates to a racing sulky generally intended for horse racing such as trotters and pacers. More specifically it relates to a racing sulky or race bike which incorporates a flexible shaft for improved racing performance of the horse and improved control by the driver of the race bike. It particularly relates to a race bike which is capable of tracking independently of the horse to which it is joined. As a result of unique construction features, the race bike is also safer in the event of an accident, e.g., where the horse falls.

In a horse racing environment at least two distinctly different conditions exist. The first represents straight-like motion which places few stresses on the race bike that are out of conformity with those on the horse. However, racing around the curve of a race track or moving around other horses causes the ordinary race bike of the prior art and those in common use today, to slide sideways as the forces on the bike tend to cause the bike to remain lined up directly behind the horse. Such sideways sliding results in a loss of energy generated by the horse and instability which must be controlled by the driver. The energy loss causes a slower passage by the horse/bike combination in the course of the race.

U.S. Pat. No. 4,326,367 incorporates ball joints at the point of connection between the shafts of the sulky frame to the harness of the horse in order to reduce twisting forces when the horse moves relative to the sulky. It is disclosed that the ball joints avoid unnecessary restraint upon the running horse by allowing only pulling forces, as opposed to twisting forces, to be applied through the shafts of the sulky.

U.S. Pat. No. 4,078,829 discloses a metal racing sulky in which the various elements comprising the sulky are adjustable to accommodate variations in the size of horse and driver. The elements are locked in position after adjustment in order to provide for a rigid structure. Adjustment of the fork includes a telescoping joint at 39 and 42 which is rigidly fastened after selection of the preferred position.

U.S. Pat. No. 4,071,257 discloses a shock-absorbing frictionally loaded lost-motion coupling which allows limited relative movement between the rails and the forks of the sulky to reduce shock load transfer back and forth between the horse and sulky.

U.S. Pat. No. 571,003 discloses a sulky wherein the seat is joined by a mechanical linkage to the wheels so that the seat is tilted and the wheels are canted as the sulky is drawn in a curved path at high speeds.

SUMMARY OF THE INVENTION

A sulky for carrying a rider behind a horse comprising an arch, a pair of wheels and a pair of substantially horizontal rails flexibly or movably coupled to said arch, said rails adapted to embrace the flanks of said horse, and further comprising stabilizing means.

A preferred embodiment provides for a pivot joint between the rail and the arch to permit lateral motion of the rail and employs a piston element, for example a shock absorber, as the stabilizing means which is disposed between and coupling each of the rails to the arch.

A particularly preferred embodiment of the invention includes a fork assembly for each side of the bike. Each fork is coupled in one of its branches to each rail at an intermediate point on the rail and is typically coupled at two points to the arch which supports the driver and each of the two wheels. With a fork assembly incorporated there is provided means for axial movement in the branch of the fork which is coupled to the rail; preferably such movement is achieved by splitting the branch at an intermediate point, appropriately adjusting the dimensions of the separated sections and allowing one part of the branch to slide within the other thereby generating telescoping motion.

BRIEF DESCRIPTION OF THE DRAWINGS

FIG. 1 is a view in perspective of a sulky or race bike embodying the present invention;

FIG. 2 is a top, fragmentary view showing the rail-to-arch junction.

FIG. 3 is an exploded view of the telescoping branch of the fork.

DETAILED DESCRIPTION OF THE PREFERRED EMBODIMENTS

Figure 4:
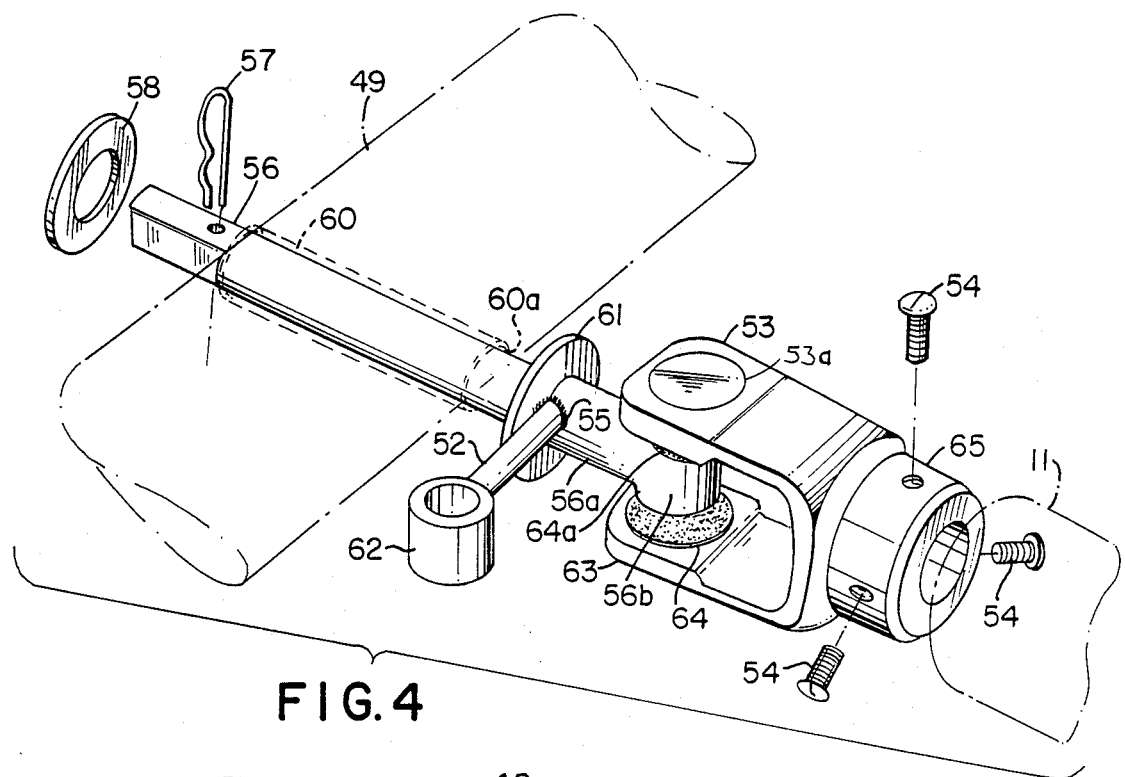
FIG. 4 is a detailed view of an embodiment showing a pivoting coupling mechanism for the rail.

Referring to FIG. 1, the invention is illustrated as embodied in a sulky 10 having a pair of substantially horizontal rails 11 and 12 adapted to be harnessed to the flanks of a horse using a conventional harness (not shown). The rails are movably or flexibly coupled to an arch 13, the two depending ends on each side, 18 and 19, and 20 and 21 of which are adapted to be conventionally connected to wheels 25 and 26 respectively. The flexibly coupled rails are limited from rotating by the stops, indicated generally by the numerals 32 and 33. A drivers seat 27 is cantilevered rearward from the central portion of the arch 13 and is typically adjustable fore and aft to suit the physical characteristics and driving preferences of the driver. Footrests, 28 and 29 are provided on the rails.

Also included in the embodiment illustrated in FIG. 1 is the fork assembly, one for each rail/wheel combination, indicated generally by numerals 14 and 14a. The fork assembly generally serves a dual purpose, to couple the rails, arch and wheels, and to protect one sulky from contacting or locking with the wheels of another. However, an alternate embodiment of the invention includes the rails and arch but excludes a fork assembly for each side of the sulky. Such a sulky may be inappropriate for a race environment with other horses and sulkies in close proximity, but it can be used, for example during training or practice sessions. Additionally, replacement of the fork assembly with alternative means to provide for the protective function of the fork still permits the flexibly coupled rails to be utilized.

A critical element of the invention is the stabilizing means, indicated generally by the numerals 30 and 31. In FIG. 1 stabilizing means is provided for each rail, 11 and 12. In the embodiment illustrated in FIG. 1 the stabilizing means couples each rail to the arch, preferably along the upper, horizontal surface. Alternatively, stabilizing means can be provided between the rails 11 and 12 at their ends adjacent to arch 13. The stabilizing means serve to damp excessive motions of the rails which are, as noted above, flexibly coupled to the arch. Suitable stabilizing means include damping means, preferably shock absorbing means, for example a gas filled shock absorber.

The forks 14 and 14a, are each comprised of a flanking strut which is comprised of elements 15 and 17 on one, and 22 and 24 on the other, and struts 16 and 23 respectively connecting the flanking struts 15 and 22 with the depending element of the arch. Elements 15 and 22 are each connected to the end of the other depending element on each side of the arch. The forks are connected at their ends by couplings which can take the form, for example, of a weld (which would fix its position) or a bolt and rubber bushing (which would permit limited flexibility); preferably the connections at the depending elements of the arch are in the form of welds whereas the connection at the rail, 17a, is in the form of a bolt.

Since the rails are flexibly coupled to the arch in a manner which permits, for example, motion in a generally horizontal plane, a sulky which includes a fork assembly, must necessarily accommodate motion in the fork assembly even though it is fixed at its ends as noted above. Such motion is accomplished in the embodiment illustrated in FIG. 1 at points 34 and 35 of the flanking strut; details of means which achieve such motion are illustrated more particularly in FIG. 3.

Figure 7:
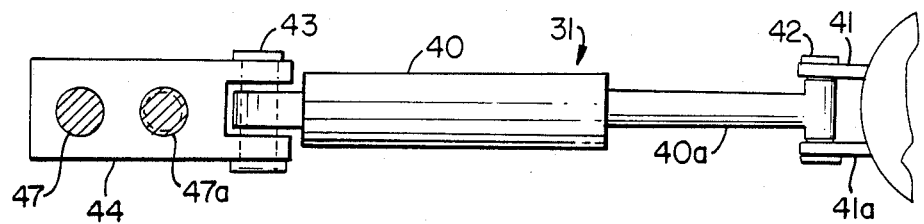
FIG. 7 is a fragmentary cross-sectional view taken on the line 7—7 of FIG. 2.

Coupling of the stabilizing means to the rails and the arch is shown in further detail in FIG. 2; only one such arrangement is illustrated since each side of the sulky is a mirror image of the other. The elements of FIG. 2 are seen in a top view which clearly shows stabilizing means 31, in this embodiment exemplified by a shock absorber, connected to the rail by means of a pin 42 passing through bearing tabs 41 and 41a, illustrated more particularly in FIG. 7. The shock absorber, comprising piston and cylinder elements 40a and 40 is coupled at its other end to the horizontal surface of the arch 49. In FIG. 2, such coupling is achieved by means of an adjustable feature, although it is readily apparent that the moveable block 44 can be fixed to the arch. Adjustability allows for fine tuning of the sulky to suit each driver/horse combination. Turning the screw element 45, which passes through the moveable block, clockwise or counterclockwise causes the block to move in a substantially horizontal plane closer to or further away from the wheel 26. The moveable block is stabilized by rod 47 which is fixed at its ends to tabs 46 and 48 which are fixed to the arch; rod 47 passing through an opening in the moveable block. Details of this structure are further illustrated in FIG. 7.

Figure 5:
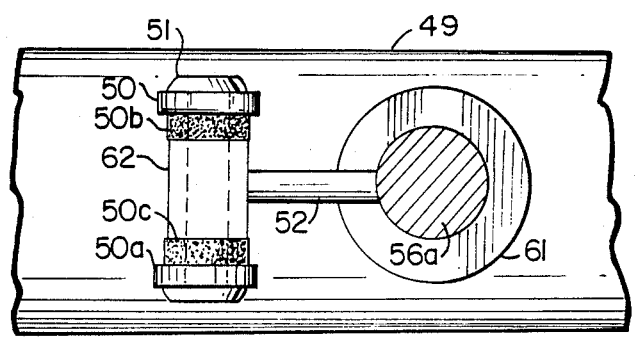
FIG. 5 is a fragmentary cross-sectional view taken on the line 5—5 of FIG. 2.
Figure 6:
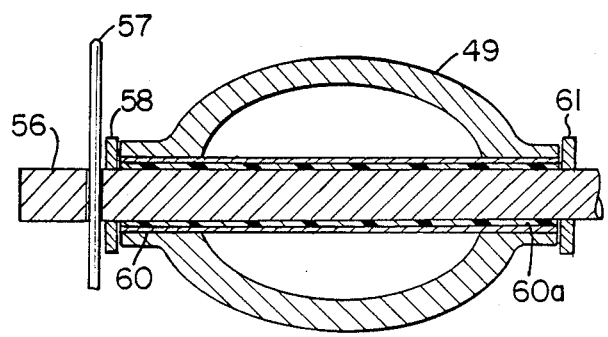
FIG. 6 is a fragmentary cross-sectional view taken on the line 6—6 of FIG. 2.

Rail 11 is joined to its flexible coupling by means of screws or bolts 54 which are preferably spaced at 120 degree intervals around the rail. This arrangement is a convenience for replacement of the rail should it show signs of wear or damage. Alternatively, the rail can be constructed as a unit including the end piece 53 which is flexibly coupled to the arch. FIGS. 4, 5 and 6 illustrate the details of the flexible coupling.

Although the stabilizing means 31 is coupled at each of its ends to the rail and arch respectively, it functions to only a limited extent to prevent rotation of the rail. Further stabilization of the rail against rotating motion is achieved by the rod 52 attached to and fixed at one end, 55, to the rail-to-arch coupling and at its other end to the arch through a tab or collar 50 and 50a attached to the arch through a pin 57 which passes through a sleeve 62. These features are illustrated in detail in FIGS. 4 and 5. The washer-like collar 61 acts as a stop and as a bearing surface for the flexible coupling shaft 56–56a which passes through the arch through metal sleeve 60 and bearing surface 60a, for example a Teflon inner sleeve. In addition, there are bearing surfaces, e.g., rubber bushings 50c and 50b for the sleeve 62. Such rubber bushings permit a limited amount of twisting motion or torque, without failure of the structure. The flexible rail coupling shaft 56–56a is secured at the rear surface of the arch by means of a cotter pin 57 and bearing-surface washer 58. As illustrated in FIG. 4, the flexible rail coupling member which is joined to the rail is a U-joint 63, connected to the shaft 56–56a, which passes through the rail, by means of a pin 53a which passes through a vertical sleeve 56b at the front end of the shaft; the sleeve contacts bearing surfaces 64 and 64a. The U-joint extension 65, closest to the rail, is of reduced cross-sectional dimension so as to fit with the rail and is joined to it by means of a connector, e.g., a threaded bolt 54.

As noted above, means for achieving motion within the fork assembly is illustrated in FIG. 3. The flanking strut of the fork assembly comprises two sections, 22 and 24 which can move relative to one another. In the preferred embodiment the extension 22a of element 22 fits within 24 and is constructed of a material such as Teflon ®which is joined to 22 by, e.g., bonding or by means of screws, and which permits sliding or telescoping motion of 24 relative to 22. Alternatively 22a can be constructed of the same material as 22 and lubricated on its outer surface so as to telescopically slide within element 24. In another alternative embodiment, element 24 is constructed of a material which slides on its inner surface against the outer surface of 22a, with or without a lubricant to facilitate such motion. Utilizing a flexible but strong material such as high density polyethylene or another engineering plastic allows for additional flexibility in the telescoping motion of 24. As noted previously, element 24 is coupled to the rail 11 at its other end by means of a removable connector such as a bolt 17a, illustrated generally in FIG. 1.

Another means of achieving motion with the fork assembly is accomplished by utilizing a piston-cylinder construction as part of the flanking strut assembly 22 and 24. Such an element is embodied, e.g., in a shock absorber and therefore it is also capable of contributing to the stability of the overall unit by dampening excessive motion of the rail to which it is joined.

Still another means of achieving motion with the fork assembly is accomplished by allowing the rearward ends of each fork, 15 and 16 on one side and 22 and 23 on the other, to pass through openings in the corresponding depending arms of the arch, 18 and 19 on one side and 20 and 21 on the other. Motion of the forks if facilitated by including a lubricated sleeve or Teflon sleeve in the openings of the depending arms through which the forks pass. In such an arrangement structural integrity is improved by locating the openings in the depending arms at approximately the same position in each arm.

The cross-sectional view of the arch, FIG. 6, illustrates the location and arrangement of the elements described above, as well as the preferably hollow construction of the arch 49 so as to conserve weight.

Figure 8:
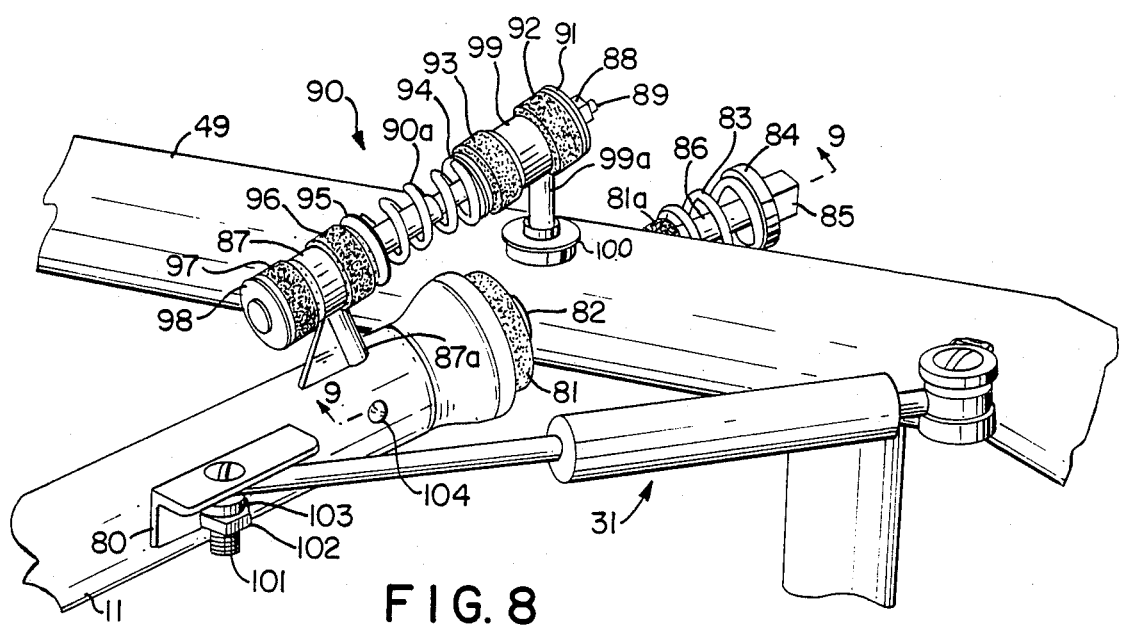
FIG. 8 is an enlarged view in perspective of an embodiment showing the rail-to-arch junction.
Figure 9:
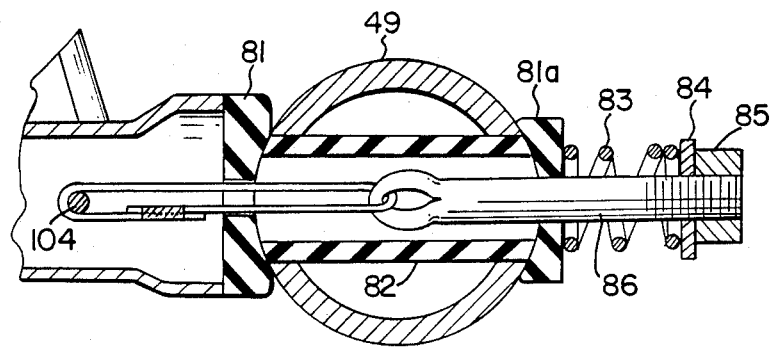
FIG. 9 is a fragmentary cross-sectional view taken on the line 9—9 of FIG. 8.

An alternative embodiment of the means to flexibly couple the rail to the arch is illustrated in detail in FIG. 8 and FIG. 9. The bracket 80, securely fastened to the rail, for example by welding, is utilized as an alternative means to couple the stabilizing means 31 to the rail at one of its ends. A resilient, shock absorbing element 81 is fitted to the end of the rail 11 and a similar shock absorbing element 81a is fitted at the rearward surface of the rail. By using such elements axial and lateral movement of the rail does not result in metal-to-metal contact between the rail and arch. An extension 82 of the rail, preferably of a stiff but flexible synthetic material such as high density polyethylene passes through an opening in the arch and has a shaft 86 disposed within it and coupled internally to the rail. A spring 83 surrounds the rearward extension of the shaft 86 and contacts the rear surface of the arch and end bearings at the end of the shaft 86 rearward of the arch. The shaft 86 is threaded at its rearward end and includes a retaining nut 85. Adjusting the retaining nut, for example in the clockwise direction, increases the compressive force on the spring 83 thereby increasing the amount of force required for axial or lateral movement of the rail.

The component 90 provides a means to limit movement of the rail 11 in a vertical plane relative to the arch and also can be adjusted as described below to vary the force required for axial movement. Component 90 is securely fastened, e.g., welded, to the rail through the shaft 87a and ring 87. Another shaft 99a and ring 99 is employed at the rearward end of component 90. The shaft 99a passes through an opening in the arch in the form of a cap 100 which is securely fastened to the arch. The tension of element 90 is also adjustable by means of the nut 88 and intermediate spring 90a, thereby allowing for further control of the extent of mobility of the rail. The shaft 89 passes through each element of component 90 and is threaded at its rearward end and includes a nut 89 for adjusting the tension of the component. Elements 91, 94, 95 and 98 are bearing surfaces, e.g. washers. Elements 92, 93, 96 and 97 are rubber bushings to facilitate flexibility and spring 90a interposed between bearings 94 and 95 is the force producing element. The stabilizing means 31 is fastened at its rail end to the brace by, e.g., a bolt 101, nut 102 and (rubber) washer 103. The rubber elements in the embodiment also permit a limited amount of twisting motion or torque to occur without failure of the structure. The coupling of the rail 11 to the arch 49 is shown in detail in FIG. 9. The shaft 86 passes through an opening in the arch; sleeve 82, preferably of a stiff, nonmetallic material, e.g., high density polyethylene or polypropylene facilitates the flexible mobility of the rail. Shaft 86 is movably joined internally to the rail by means of a cable passing through an eyelet at the internal end of shaft 86 and crimp fastened around bolt 104 which passes through the rail.

It is to be understood that, for the purposes of the present invention, flexible coupling of the rail to the arch refers to the ability of the rail to undergo significant movement especially in comparison to the rigid, e.g., welded construction of the prior art. Such movement would be particularly apparent in the absence of stabilizing means 31. From the alternative embodiments of the rail-to-arch coupling means which have been exemplified, the present invention includes differing types of rail movement, e.g., primarily lateral horizontally (FIG. 2) and primarily axial and vertical with some lateral movement (FIG. 8). Additionally, differing degrees of the range of motion which the flexible coupling permits have been illustrated by the alternative embodiments; the embodiment illustrated in FIG. 2 can result in a significant range of motion whereas the embodiment illustrated in FIG. 8 represents a lesser range of motion but still substantial compared to prior art rigid structures.

The improved sulky of the present invention also has advantages with regard to safety. Clearly, the sulky has improved control features since it is not subject to sliding out around a turn as a result of its unique, accurate tracking characteristics as described earlier. Furthermore, in the event of a spill or fall by the horse, the fork can separate at points 34 and/or 35 and maximum stress on the rail will occur at a point rearward of the fork to rail juncture. In the absence of forks in the construction, as described hereinabove, the maximum stress will also occur in this rearward location. Resulting failure or fracture of the rails at this rearward location can result in the driver being spilled from the seat, but it is less likely to cause the rails to be driven into the track, (as would occur if the rails fractured at a more forward position) resulting in a catapulting of the driver and accompanying severe injury to the driver.

While the invention has been described above having reference to two embodiments and variations thereon, illustrating its versatility, it will be understood that it can take other forms and arrangements within the scope, function and spirit of the invention which should not, therefore, be regarded as limited, except as defined by the following claims:

What is claimed is:

1. A sulky for carrying a rider behind a horse comprising an arch, a pair of wheels connected to said arch, a pair of rails extending along the longitudinal axis of said sulky, coupling means for coupling said rails to said arch, said coupling means including means for permitting axial movement of said rails along said longitudinal axis relative to said arch, lateral movement of said rails about vertical pivot axes relative to said arch, and limited rotary movement of said rails about their longitudinal axes relative to said arch, fork means connected between said rails and said arch, and stabilizing means connected between said rails and said arch for dampening movement therebetween.

2. A sulky as set forth in claim 1, said coupling means comprising impact absorbing means rearwardly mounted on said rail adjacent said arch, an extension of said rail passing axially through an aperture in said arch and including tension means to couple said rail to said arch.

3. A sulky as set forth in claim 2, further including vertical motion limiting means.

4. A sulky as set forth in claim 3 wherein said vertical motion limiting means comprises an axial shaft spaced apart from said rail and fixedly joined adjacent one end to said rail and including an attached vertical shaft adjacent the other end slidably engaged into an opening in said arch, and tension means interposed between said two ends of said axial shaft.

5. A sulky as set forth in claim 1 wherein each said fork means comprises a fork assembly, said fork assembly comprises a flanking strut movable relative to its longitudinal axis, said flanking strut coupled at one of its ends to said rail and coupled at its other end of said arch, and a strut coupled at its rearward end to said arch and coupled at its forward end to said flanking strut and further comprising means for axial movement in that portion of said flanking strut forward of the coupling of said strut with said flanking strut.

6. A sulky as set forth in claim 5, said axial movement means comprising telescoping means.

7. A sulky as set forth in claim 6, said axial movement means comprising a low friction member mounted axially on and integral with said portion of said flanking strut forward of the coupling of said strut with said flanking strut to facilitate telescoping motion.

8. A sulky as set forth in claim 5, said axial movement means comprising a piston element.

9. A sulky as set forth in claim 1, said stabilizing means adjustably joined to said arch.

10. A sulky as set forth in claim 1, said stabilizing means comprises a shock absorbing element.

11. A sulky as set forth in claim 1, said stabilizing means fixedly joined to said arch.

12. A sulky as set forth in claim 11, said stabilizing means comprising a shock absorbing element.

13. A sulky for carrying a rider behind a horse comprising an arch, a pair of wheels connected to said arch, a pair of rails extending along the longitudinal axis of said sulky, coupling means for pivotally coupling said rails to said arch, said coupling means including means for permitting lateral movement of said rails about vertical pivot axes relative to said arch and limited rotary movement of said rails about their longitudinal axes relative to said arch, fork means connected between said rails and said arch, and stabilizing means connected between said rails and said arch for dampening movement therebetween.

14. A sulky as set forth in claim 13 wherein said pivotal coupling is a pivot joint, the rearward projection of said pivot joint passes axially through an aperture in said arch, said rearward projection fixed to the outer surface of said arch adjacent said aperture.

15. A sulky as set forth in claim 14, wherein each said fork means comprises a fork assembly, said fork assembly comprises a flanking strut movable relative to its longitudinal axis, said flanking strut coupled at one of its ends to said rail and coupled at its other end to said arch, and a strut coupled at its rearward end to said arch and coupled at its forward end to said flanking strut and further comprising means for axial movement in that portion of said flanking strut forward of the coupling of said strut with said flanking strut.

16. A sulky as set forth in claim 15, said axial movement means comprising telescoping means.

17. A sulky as set forth in claim 16, said axial movement means comprising a low friction member mounted axially on and integral with said portion of said flanking strut forward of the coupling of said strut with said flanking strut to facilitate telescoping motion.

18. A sulky as set forth in claim 17, said stabilizing means comprises a shock absorbing element.

19. A sulky as set forth in claim 18, said stabilizing means fixedly joined to said arch.

20. A sulky as set forth in claim 18, said stabilizing means adjustably joined to said arch.

* * * * *